(12) United States Patent
Brasfield (10) Patent No.: US 10,376,037 B1
(45) Date of Patent: Aug. 13, 2019

(54) CELL PHONE CLOTHING ANCHORING SYSTEM

(71) Applicant: Angela Brasfield, Montgomery, AL (US)

(72) Inventor: Angela Brasfield, Montgomery, AL (US)

( * ) Notice: Subject to any disclaimer, the term of this patent is extended or adjusted under 35 U.S.C. 154(b) by 0 days.

(21) Appl. No.: 16/026,346

(22) Filed: Jul. 3, 2018

Related U.S. Application Data (60) Provisional application No. 62/529,101, filed on Jul. 6, 2017.

(51) Int. Cl.
| | |
|---|---|
| *A45F 5/02* | (2006.01) |
| *F16M 13/04* | (2006.01) |
| *A45C 13/10* | (2006.01) |
| *A45C 11/00* | (2006.01) |
| *H04B 1/3827* | (2015.01) |
| *A41D 1/00* | (2018.01) |

(52) U.S. Cl.
CPC ............ *A45F 5/02* (2013.01); *A45C 13/1069* (2013.01); *F16M 13/04* (2013.01); *A41D 1/002* (2013.01); *A45C 2011/002* (2013.01); *H04B 1/385* (2013.01)

(58) Field of Classification Search
CPC . Y10T 24/13; Y10T 24/1391; Y10T 24/1394; Y10T 24/3443; Y10T 24/32; Y10T 24/3439; Y10T 24/344; A44D 2203/00; A41F 1/002; A41F 1/006; H05K 5/02
USPC ....................................................... 248/683
See application file for complete search history.

(56) References Cited

U.S. PATENT DOCUMENTS

| | | | |
|---|---|---|---|
| 6,598,268 B1 * | 7/2003 | Zelman | ..................... A45F 5/02 24/13 |
| 8,408,513 B2 | 4/2013 | Smith | |
| 8,898,816 B2 | 12/2014 | Highfield | |
| 9,402,121 B2 | 7/2016 | Abreu | |
| 2007/0099681 A1 | 5/2007 | Kielland | |
| 2009/0023484 A1 | 1/2009 | Macklin | |
| 2012/0034842 A1 | 2/2012 | Roberts et al. | |
| 2013/0219667 A1 * | 8/2013 | Walczak | ................ A44B 99/00 24/3.1 |
| 2014/0159840 A1 | 6/2014 | Qadri | |
| 2014/0189927 A1 | 7/2014 | Kidman | |
| 2015/0195392 A1 | 7/2015 | Nissenbaum | |
| 2015/0250297 A1 | 9/2015 | Schrier | |

(Continued)

FOREIGN PATENT DOCUMENTS

WO     WO2015106179     7/2015

*Primary Examiner* — Robert Sandy
*Assistant Examiner* — Michael S Lee
(74) *Attorney, Agent, or Firm* — Goldstein Law Office, P.C.

(57) ABSTRACT

A cell phone holder, for attaching to a user while wearing a bra having cups. The holder has a carrier and a bilateral clip assembly. The bilateral clip assembly attaches to the cups of the bra. The carrier secures to a cell phone and has a pair of magnets. A neck chain allows the carrier to be tethered around the neck of the user, while the magnets allow the carrier to be selectively secured against the torso garment of the user with the weight of the carrier and its contents fully supported by the bilateral clip assembly and bra, and selectively detached when desired to access the cell phone.

8 Claims, 6 Drawing Sheets

(56) References Cited

U.S. PATENT DOCUMENTS

2016/0007722 A1\* 1/2016 Macon .................... A41F 1/002
2/426

\* cited by examiner

CELL PHONE CLOTHING ANCHORING SYSTEM

CROSS REFERENCES AND RELATED SUBJECT MATTER

This application is a non-provisional filing of provisional patent application Ser. No. 62/529,101, filed in the United States Patent Office on Jul. 6, 2017, from which priority is claimed and which is incorporated by reference herein in its priority.

TECHNICAL FIELD

The present disclosure relates generally to a cell phone holder. More particularly, the present disclosure relates to a cell phone holder that extends around the neck of a user to remain conveniently available and anchors securely to the clothing of the user.

BACKGROUND

Since cell phones became the norm in the late 90s, people carry their phones everywhere they go. Unfortunately, this often means they end up physically carrying their phones much of the time.

Women typically have a convenient place to carry their phones—in their purses. But when they are not carrying their purses, they might not have another location to place their phone. The pockets in many women's garments are often too small for a typical cell phone. As a result, they are relegated to holding their phone in their hand. Thus, when engaged in various physical activities that make carrying a purse inconvenient, it is then especially inconvenient to then hold a phone in your hand.

Some purses or device holders are configured with a chain or strap that makes them suitable to be worn around the neck. Unfortunately this means it will swing, bump, or flop around as its wearer is engaged in intense physical activity, and sometimes even when the wearer is just walking.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a holder that allows a cell phone to be conveniently carried in a hands-free manner, and readily available when needed. Accordingly, the present disclosure provides a holder that includes a carrier component that is configured to secure to a cell phone. Adhesive on the carrier selectively secures to maintain the phone on the carrier and does not interfere with the normal usage of the phone. The holder has a chain connected to the carrier that allows it to be worn around the neck of a user/wearer to keep it conveniently available.

Another aspect of an example embodiment in the present disclosure is to provide a holder that may be worn around the neck, allows full movement, yet keeps its weight off the neck and shoulders and does not swing or move when the wearer engages in physical activity. Accordingly, the holder is adapted to clip the carrier onto the garment to support the weight of the phone against the body of the user, stay securely in place, and detaches easily from the garment when desired.

It is yet another aspect of an example embodiment in the present disclosure to provide a holder that provides an aesthetically pleasing appearance, while fulfilling its functional requirements and operational goals. Accordingly, the holder has a bilateral clip assembly that is hidden beneath an outer garment and attaches to the cups of a bra. The carrier has a pair of magnets that selectively engage the bilateral clip assembly through an outer garment of the wearer. The clip is not visible to others and the holder is held in a centered position on the wearer, supporting the full weight of the phone by the bra.

It is a further aspect of an example embodiment in the present disclosure to provide a holder that can be used with any existing garment. Accordingly, the bilateral clip assembly is configured to attach onto the cups of any bra. The magnetic configuration of the holder operates through the outer torso garment, and thus allows the holder to be used with any outer garment, including shirts and blouses of all kinds.

Accordingly, the present disclosure describes a cell phone holder, for attaching to a user while wearing a bra having cups. The holder has a carrier and a bilateral clip assembly. The bilateral clip assembly attaches to the cups of the bra. The carrier secures to a cell phone and has a pair of magnets. A neck chain allows the carrier to be tethered around the neck of the user, while the magnets allow the carrier to be selectively secured against the outer garment of the user with the weight of the carrier and its contents fully supported by the bilateral clip assembly and bra, and selectively detached when desired to access the cell phone.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
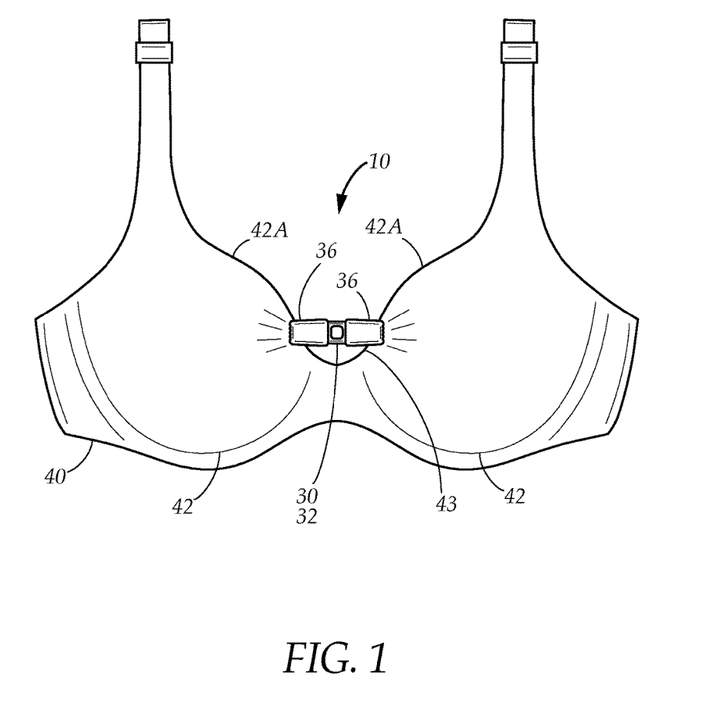
FIG. 1 is a front elevational view, showing just the bilateral clip assembly component of the holder, attached to the cups of a bra.
Figure 2:
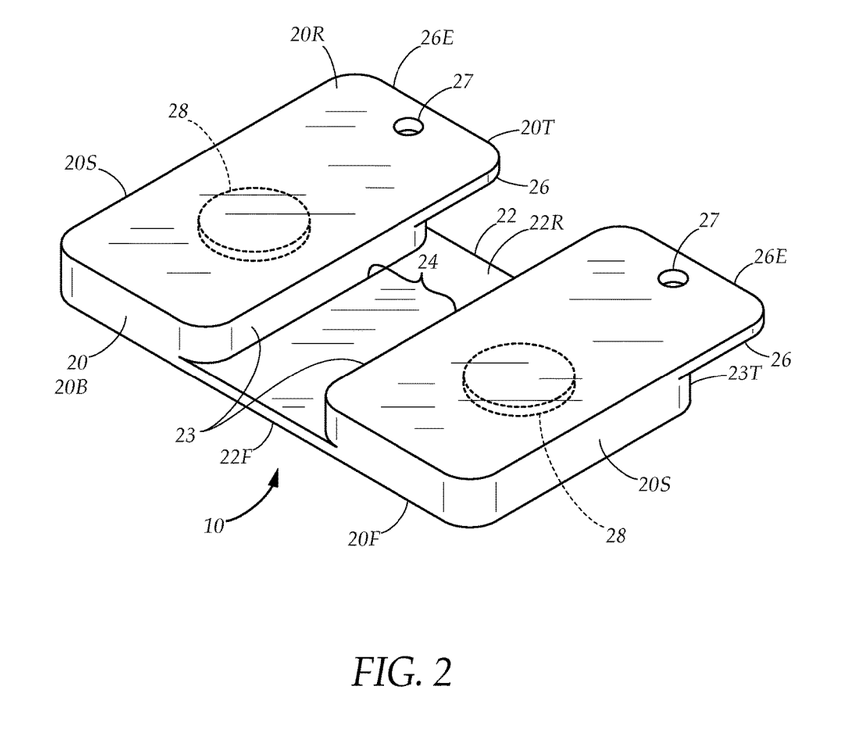
FIG. 2 is a diagrammatic perspective view, showing a carrier component of the holder, containing a pair of magnets therein.
Figure 3:
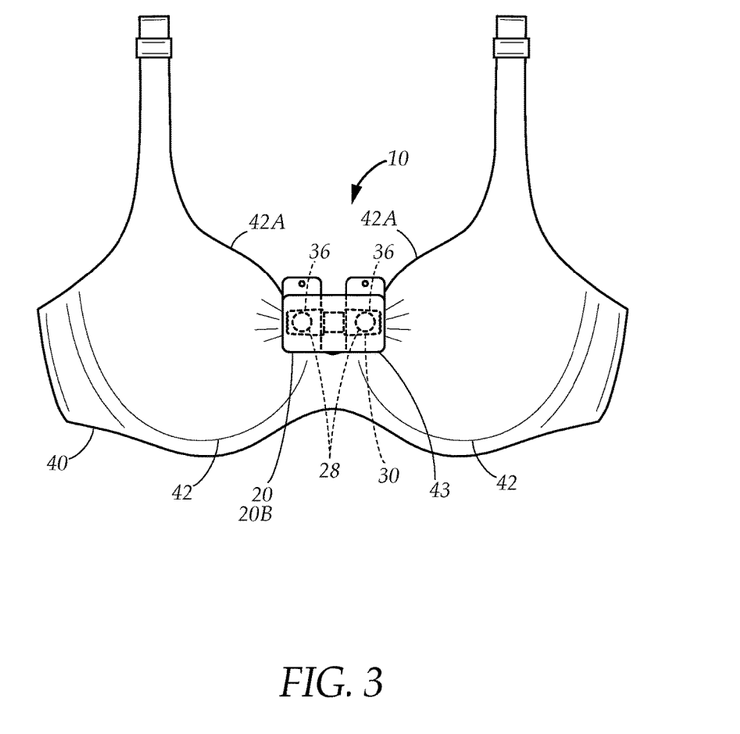
FIG. 3 is a diagrammatic perspective view, illustrating the carrier secured to the clip.

FIGS. 1-3 together illustrate a holder assembly 10, in accordance with the present disclosure. In particular, the holder assembly 10 includes a carrier 20, and a bilateral clip assembly 30. The carrier 20 is configured to secure magnetically to the bilateral clip assembly 30, and the bilateral clip assembly 30 is configured to secure to a bra 40.

Figure 4:
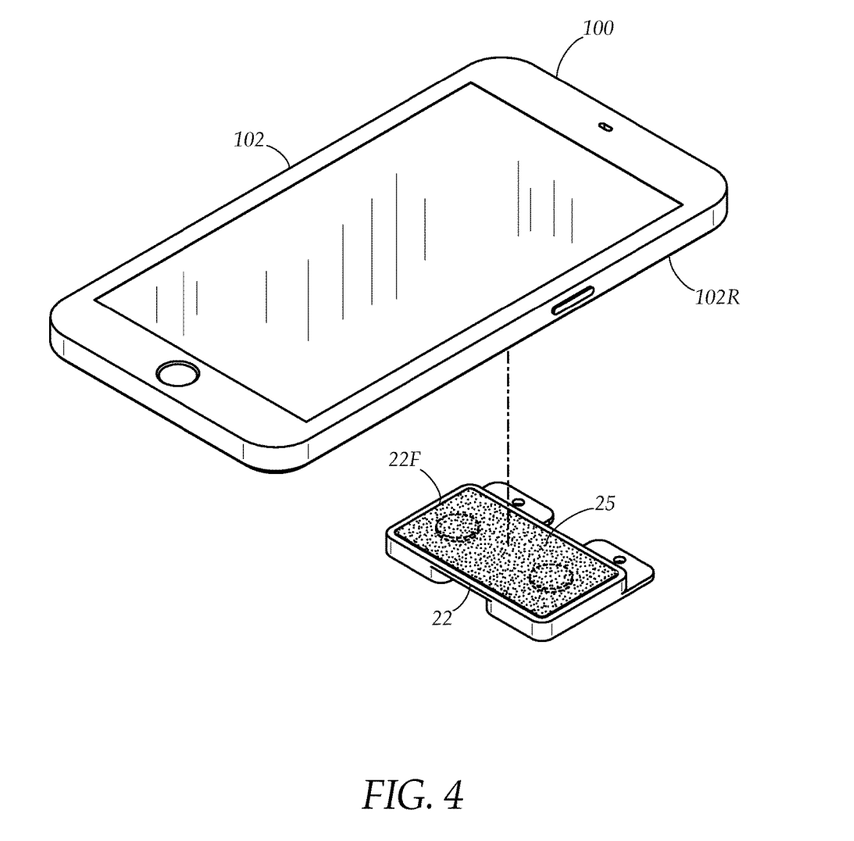
FIG. 4 is a diagrammatic perspective view, illustrating attachment of the cell phone to the carrier.

Referring to FIG. 2, the carrier 20 has a front 20F, a rear 20R, a pair of sides 20S, a top 20T, and a bottom 20B. The carrier 20 also includes a main panel 22 at the front 20F of the carrier 20. The main panel 22 has a main panel plane that spans between the pair of sides 20S, and has a main panel front 22F and main panel rear 22R. Referring momentarily to FIG. 4, the main panel 22 has an adhesive pad 25 on the main panel front 22F that substantially spans the main panel 22 to allow a cell phone 100 to be affixed thereto. In particular, the cell phone 100 has a housing 102 having a housing rear 102R. The main panel front 22F is adhesively secured to the housing rear 102R. Note that this adhesive connection can be made indirectly through hook and loop fasteners (or the like) that are adhesively secured to the housing rear 102R and the main panel front 22F, and by selectively securing such hook and loop fasteners together.

Referring again to FIG. 2, the carrier 20 also has a pair of magnet housings 23 that are attached and extend rearwardly from the main panel rear 22R and are spaced apart by a trough 24 that extends fully between the top 20T and bottom 20B across the rear 22R of the main panel 22. The magnet housings 23 having a thickness between the main panel rear 22R and the rear 20R of the carrier and each have a magnet housing top 23T. A pair of tabs 26 are attached to the carrier 20 and in this embodiment extend upwardly from the magnet housings 23 beyond the magnet housing tops 23T. The tabs 26 are thinner than the magnet housings 23 and thus recess the tabs 26 from the front 20F of the carrier 20. The tabs 26 each have a free end 26E fully opposite from the main magnet housings 23. Also seen in FIG. 2, the main panel 22 has a pair of attachment holes 27 that extend through the tabs 26. The carrier 20 also has a pair of magnets 28 which are each located within one of the magnet housings 23 in proximity to the rear 20R of the carrier. The magnets 28 can be any suitable size for maintaining and breaking the connection described hereinafter, and may be installed into the magnet housings 23 through slots, recesses, or openings, and can be permanently encased within the magnet housings 23.

Referring to FIG. 1, the bra 40 has a pair of cups 42, each having an inner edge 42A that together define a middle space 43 between the cups 42. When the bra 40 is worn by the user, the middle space 43 is centered on the chest of the user. The bilateral clip assembly 30 has a center 32 and includes a pair of clips 36 that extend outwardly from the center. The clips 36 preferably extend substantially one hundred eighty degrees apart, such that they extend in opposite directions and each engage the inner edge 42A of one of the cups 42 so that the bilateral clip assembly 30 extends horizontally. The clips 36 may have an alligator clip configuration, be configured with serrations or smooth, or have any other configuration suitable to grasp the cups 42 by their inner edge 42A. The bilateral clip assembly 30 is thereby configured to extend and center itself within the middle space 43, centered between the cups 42. The bilateral clip assembly 30 is magnetically attractive or includes a magnetically attractive component or components.

Referring to FIG. 3, the carrier 20 is shown secured to the bilateral clip assembly 30, wherein the magnets of 28 of the carrier 20 are magnetically attracted to the bilateral clip assembly 30. Note that typically the carrier 20 would not be in direct physical contact with the bilateral clip assembly 30, as there would be a garment in between them as described hereinbelow. Also note that the magnets 28 are preferably aligned along a horizontal axis that is parallel to the bottom 20B of the carrier 20, which keeps the carrier 20 horizontal and in turn centers the carrier 20 between the cups 42 of the bra 40, and thereby keeps the carrier 20 centered on the chest of its wearer. Through this magnetic connection between the carrier 20 and bilateral clip assembly 30 and the connection between the bilateral clip assembly 30 and the bra 40, the weight of the carrier 20 and the cell phone attached thereto is effectively supported by the bra 40. Also, through the close physical connection between the components and with the user, all alerts and vibrations of the cell phone attached to the carrier 20 can be felt and heard by the user. Note that the magnets 28 and the magnetically attractive portions of the bilateral clip assembly 30 are made of a magnetically attractive metal (such as iron, nickel, or cobalt), respectively, but may also be reversed where the bilateral clip assembly 30 has the magnets and the carrier 20 has a metallic portion.

Figure 5:
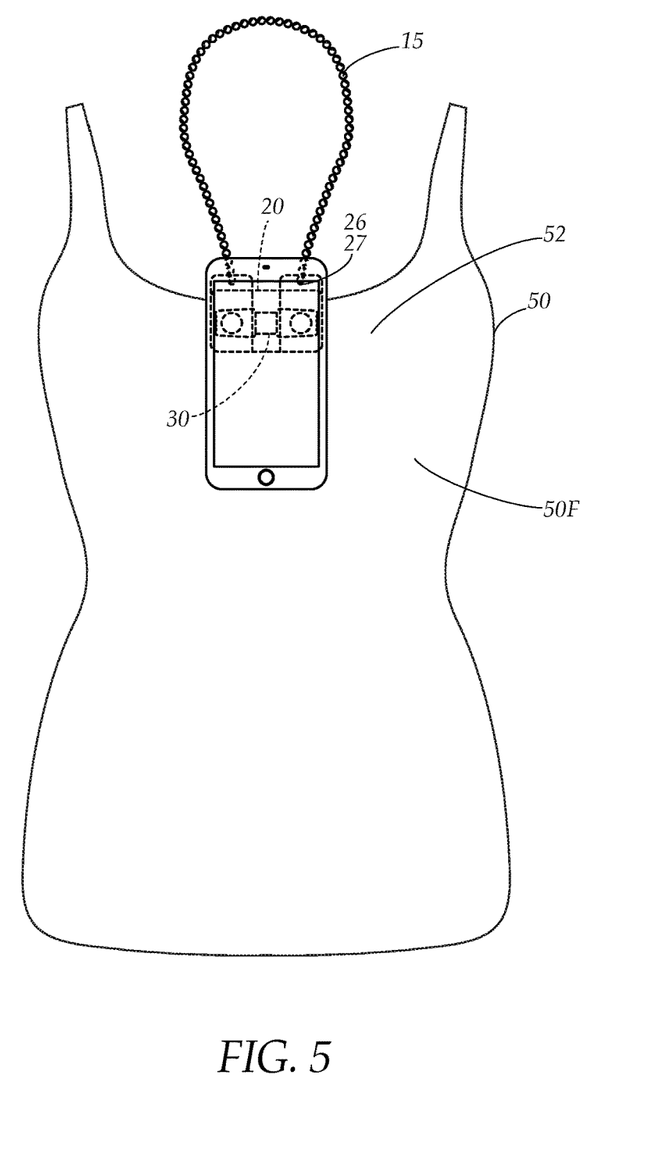
FIG. 5 is a diagrammatic perspective view, similar to FIG. 3, with the phone installed and except wherein a neck chain is attached to the carrier.

FIG. 5 illustrates a torso garment 50, which is an outer garment having a torso garment front 50F and a chest area 52. During normal usage, when the carrier 20 is magnetically secured to the bilateral clip assembly 30 as shown in FIG. 3, the carrier 20 is actually held against the torso garment front 50F of the outer garment 50 in the chest area 52 as shown in FIG. 5. Just as the bilateral clip assembly 30 is not seen in FIG. 5 because it is concealed by the torso garment 50, it is also not seen by others during ordinary usage of the holder assembly 10.

Figure 6:
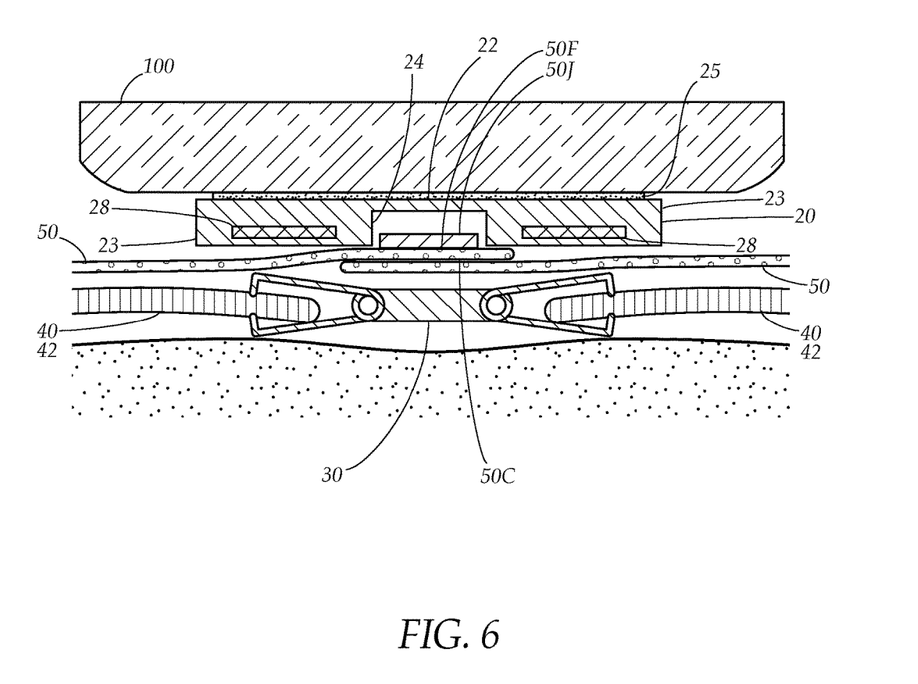
FIG. 6 is a top plan view, with parts broken away, illustrating the attraction of the carrier to the clip, through the outer torso garment.

As illustrated in FIG. 6, the cell phone 100 is attached to the carrier 20 by the adhesive pad 25. The bilateral clip 30 is securely attached to the cups 42 of the bra 40. The main panel 22 of the carrier 20 is held against the outer garment front 50F of the outer garment 50 by the magnetic attraction between the magnets 28 and the bilateral clip assembly 30. Note that the garment 50 is shown having a vertical seam 50C, such as a typical overlapping seam centrally located on a button-down shirt or zip-up sweatshirt. The vertical seam 50C includes a fastener 50J such as a button (as shown), or a zipper. The magnet housings 23 are configured to straddle the fastener 50J such that the fastener 50J extends into the trough 24 with the magnet housings 23 extending alongside. In particular, the vertical seam 50C extends vertically through the trough 24 without interference. Accordingly, the magnets 28 secure the carrier 20 to the bilateral clip assembly 30 on both sides of the vertical seam 50C of the garment 50. The carrier 20 may be easily detached from the bilateral clip 30 and from its position against the outer garment 50 by sliding the carrier 20 laterally or twisting it around as horizontal axis and thereby breaking the magnetic polarity and freeing the magnetics 28 from the magnetically attractive portions of the bilateral clip assembly 30.

Referring again to FIG. 5, a neck chain 15 has a pair of free ends that are each secured in one of the attachment holes 27 in the tabs 26 of the carrier 20. The neck chain 15 is configured to extend around the neck of the wearer and keeps the carrier 20 tethered to the user. During typical usage, however, the neck chain 15 does not support the weight of the carrier 20 or its contents, since the carrier 20 is held securely against the outer garment 50 as described hereinabove. Note that the neck chain 15 may be secured to the carrier 20 as shown and also in a variety of other ways, including by providing tabs with eyelets adjacent to the trough 24 (not shown).

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a cell phone holder that is configured to be worn by the user and secure to the chest of the user. The disclosure is illustrated by example in the drawing figures, and throughout the written description. It should be understood that numerous variations are possible, while adhering to the inventive concept. Such variations are contemplated as being a part of the present disclosure.

What is claimed is:

1. A cell phone clothing anchoring system, for use by a person having a cell phone having a housing having a rear, and wearing a torso garment and a bra having a pair of cups, comprising:
    a bilateral clip having a magnetically attractive material and a pair of clips, the clips adapted for attaching to the cups of the bra; and
    a carrier having a top, a bottom, a front, a rear, a pair of sides, a main panel at the front of the carrier spanning between the pair of sides, the main panel having a front and a rear, a pair of magnet housings extending from the main panel toward the rear, a trough extending between the magnet housings fully between the top and bottom, the magnet housings spaced apart on the main panel by the trough, the carrier having adhesive spanning the front adapted for attaching to the rear of the cell phone housing, the carrier adapted for selectively securing against the torso garment by attracting the magnets to the bilateral clip through the torso garment.

2. The cell phone clothing anchoring system as recited in claim 1, wherein the carrier further comprises a pair of tabs, each tab having an attachment hole extending through the tab: and a neck chain having a pair of ends, each of the ends attached in one of the attachment holes.

3. The cell phone clothing anchoring system as recited in claim 2, wherein the main panel extends in a plane; wherein the magnet housings have a thickness and a top; and wherein the tabs extend beyond the top of the magnet housings and are thinner than the magnet housings so that the tabs are spaced from the plane of the main panel.

4. A cell phone clothing anchoring system, for use by a person having a cell phone having a housing having a rear, and wearing a torso garment and a bra having a pair of cups, comprising:
    a bilateral clip having a magnetically attractive material and a pair of clips that extend one hundred eighty degrees away from each other, the clips adapted for attaching to the cups of the bra;
    a carrier having a top, a bottom, a front, a rear, a pair of sides, a main panel at the front of the carrier spanning between the pair of sides, the main panel having a front and a rear, a pair of magnet housings extending from the main panel toward the rear, a pair of tabs that each extend from one of the magnet housings and have an attachment hole, a trough extending between the magnet housings fully between the top and bottom such that the main panels bridges between the magnet housings, the magnet housings spaced apart on the main panel by the trough, the carrier having adhesive spanning the front adapted for attaching to the rear of the cell phone housing, the carrier adapted for selectively securing against the torso garment by attracting the magnets to the bilateral clip through the torso garment; and a neck chain extending through the attachment holes.

5. The cell phone clothing anchoring system as recited in claim 4, wherein the tabs extend upwardly beyond the main panel and are spaced rearwardly from the front of the carrier by the magnet housings.

6. A cell phone clothing anchoring method, for use by a user wearing a torso garment and a bra having cups beneath the torso garment, having a cell phone having a housing having a housing rear, using a bilateral clip and a carrier having a main panel having a front and pair of magnet housings extending rearwardly from the main panel that each contain a magnet, comprising the steps of:

securing the carrier to the cell phone by affixing the cell phone rear to the main panel front;

attaching the bilateral clip to the bra by clipping to each of the bra cups; and securing the cell phone against the user by attracting the pair of magnets to the bilateral clip through the torso garment.

7. The cell phone clothing anchoring method as recited in claim 6, wherein the torso garment has a vertical seam having a fastener; wherein the carrier has a trough between the magnet housings; and wherein the step of securing the cell phone against the user further comprises extending the magnet housings alongside the fastener with the fastener extending in the trough between the magnet housings.

8. The cell phone clothing anchoring method as recited in claim 7, wherein the carrier has a pair of tabs each having an attachment hole; and wherein the step of securing the carrier to the cell phone further comprises the step of securing a neck chain to each of the attachment holes.

\* \* \* \* \*